(12) United States Patent
Manne et al.

(10) Patent No.: US 6,170,991 B1
(45) Date of Patent: Jan. 9, 2001

(54) PROPELLOR THRUST BEARING

(75) Inventors: Nils Manne, Göteborg; Christian Bildtsén, Lerum, both of (SE)

(73) Assignee: Aktiebolaget SKF AB, Gothenburg (SE)

( * ) Notice: Under 35 U.S.C. 154(b), the term of this patent shall be extended for 0 days.

(21) Appl. No.: 09/190,299

(22) Filed: Nov. 13, 1998

(51) Int. Cl.[7] .................................................. F16C 19/54
(52) U.S. Cl. ........................................ 384/455; 384/563
(58) Field of Search ................................ 384/455, 558, 384/551, 563, 568, 618, 619, 620, 584, 585, 538, 540, 202

(56) References Cited

U.S. PATENT DOCUMENTS

| 1,893,948 | | 1/1990 | Hoch . | |
| 2,118,760 | * | 5/1938 | Ernst | 384/455 |
| 3,751,124 | | 8/1973 | Hanson et al. . | |
| 4,033,556 | * | 7/1977 | Anders | 384/202 |
| 4,085,984 | * | 4/1978 | Cameron | 384/563 |
| 4,124,256 | * | 11/1978 | De Senneville | 384/455 |
| 4,808,013 | * | 2/1989 | Waddington | 384/558 X |
| 5,474,388 | * | 12/1995 | Kellstrom et al. | 384/558 |
| 5,887,984 | * | 3/1999 | Duval | 384/563 X |
| 6,033,123 | * | 3/2000 | Sato et al. | 384/564 X |

FOREIGN PATENT DOCUMENTS

| 3112306 | 10/1982 | (DE) . |
| 345245 | 3/1931 | (GB) . |
| 63-11498 | 1/1988 | (JP) . |

\* cited by examiner

Primary Examiner—David A. Bucci
Assistant Examiner—Colby Hansen
(74) Attorney, Agent, or Firm—Burns, Doane, Swecker & Mathis, L.L.P.

(57) ABSTRACT

A propeller thrust bearing assembly includes a spherical rolling bearing provided on a shaft and abutting against a shoulder, and a spherical thrust bearing, incorporating a shaft washer fitted on the shaft, a housing washer provided in a housing surrounding the shaft and a set of rolling bodies provided between the shaft washer and the housing washer. A spacing sleeve is provided between the spherical rolling bearing and the spherical thrust bearing, and a lid member is attached to the housing. The lid member is adapted to urge the housing washer against the set of rolling bodies and via the rolling bodies against the shaft washer. The axial distance between the two bearings is such that their force lines meet at a point situated on the center axis of the shaft. The spherical rolling bearing has a taper bore and is mounted on a withdrawal sleeve, and the spacing sleeve has internal threads and is screwed onto the withdrawal sleeve. A tubular member is arranged about the shaft and is adapted to keep the shaft washer pressed against the rear end of the spacing sleeve facing away from the spherical rolling bearing. The tubular member is secured in position by means of a locking nut screwed onto the threads of the shaft.

15 Claims, 1 Drawing Sheet

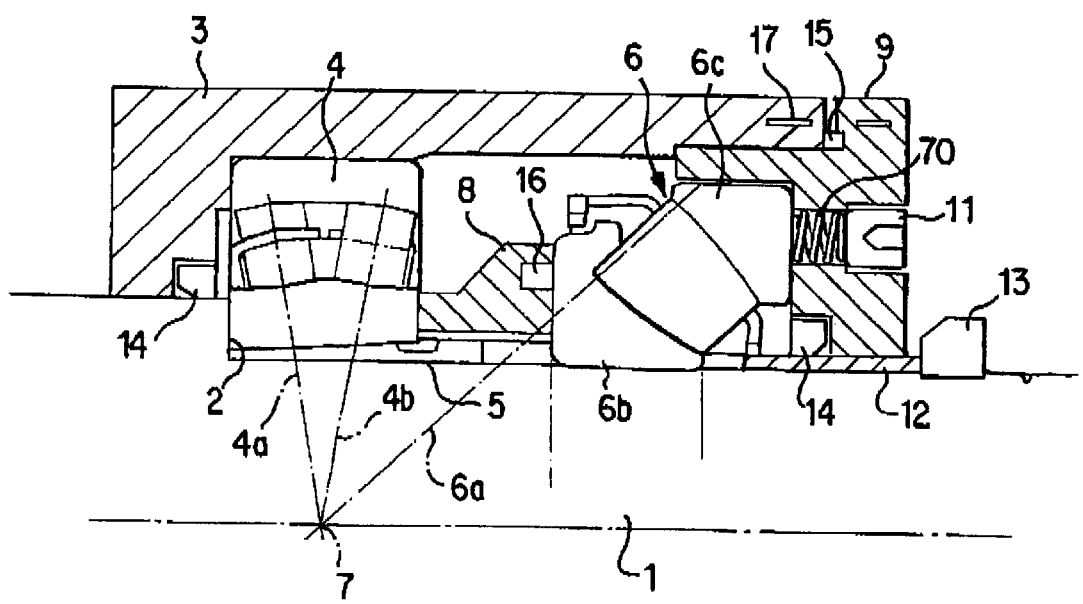

PROPELLOR THRUST BEARING

The present application corresponds to and claims priority under 35 U.S.C. § 119 with respect to Swedish Application No. 9704203-0 filed on Nov. 13, 1997, the entire content of which is incorporated herein by reference.

FIELD OF THE INVENTION

The present invention generally relates to a bearing assembly. More particularly the present invention pertains to a thrust bearing assembly for a ship propeller.

BACKGROUND OF THE INVENTION

Known bearing assemblies used on a propellor of a ship are typically mounted on a shaft having several raised cylindrical portions which serve as bearing seats for a double-row spherical roller bearing and for the shaft washer of a spherical roller thrust bearing. The spherical roller bearing is mounted directly on the raised cylindrical shaft with a close fit, whereas the shaft washer of the spherical roller thrust bearing is mounted on another such raised portion, usually with a looser fit than the spherical roller bearing. Mechanisms are also provided which, from the outside, urge the housing washer and the set of rollers against the shaft washer. To obtain a correct distance between the two bearings, a spacing ring has been used. The spacing ring is positioned in a deeper portion of the shaft between the two bearing seats, and for this reason the spacing ring has to be split.

The shaft provided with several such raised portions requires a time-wasting and expensive machining during manufacture of the shaft. Problems also arise during mounting and especially at dismounting of such a bearing assembly. The complex structural design means that dismounting requires many different tools and aids. At the same time, the bearing exchange and over-hauling must often be effected during hard working conditions in the ship.

In light of the foregoing, a need exists for a thrust bearing assembly, such as a propellor thrust bearing assembly, and a method of mounting such a bearing assembly that are not susceptible to the same disadvantages and drawbacks as other known thrust bearing assemblies and mounting methods.

SUMMARY OF THE INVENTION

According to one aspect of the present invention, a propeller thrust bearing assembly includes a housing surrounding a shaft, a spherical rolling bearing provided on the shaft and abutting against a shoulder provided on the shaft, and a spherical thrust bearing comprised of a shaft washer fitted on the shaft, a housing washer provided in the housing, and a set of rolling bodies provided between the shaft washer and the housing washer. A spacing sleeve is provided between the spherical rolling bearing and the spherical thrust bearing, and a lid member is mounted around the shaft and adapted to urge the housing washer against the set of rolling bodies and via the rolling bodies against the shaft washer. The axial distance between the spherical rolling bearing and the spherical thrust bearing is such that respective force lines meet at a point situated on the center axis of the shaft. The spherical rolling bearing has a taper bore and is mounted on a withdrawal sleeve that is positioned on the shaft. The spacing sleeve has internal threads and is screwed onto an external thread on the withdrawal sleeve. A tubular member is arranged about the shaft to keep the shaft washer pressed against the end of the spacing sleeve facing away from the spherical rolling bearing, and this tubular member is secured in position by a locking nut screwed onto threads on the shaft.

According to another aspect of the invention, a propeller thrust bearing assembly includes a spherical rolling bearing mounted on a shaft and abutting against a stop provided on the shaft, and a spherical thrust bearing comprised of a shaft washer fitted on the shaft, a housing washer, and a set of rolling bodies located between the shaft washer and the housing washer. A spacing sleeve is located between the spherical rolling bearing and the spherical thrust bearing to space the spherical rolling bearing from the spherical thrust bearing, with the spacing sleeve including an internal thread engaging a threaded portion on the shaft. A lid member is adapted to axially urge the housing washer towards the set of rolling bodies.

A further aspect of the invention involves a process for dismounting a propeller thrust bearing assembly mounted on a shaft. The assembly includes a spherical rolling bearing provided on the shaft and abutting a shoulder, a spherical thrust bearing comprising a shaft washer fitted on the shaft, a housing washer provided in a housing surrounding the shaft and a set of rolling bodies provided between the shaft washer and the housing washer, a spacing sleeve provided between the spherical rolling bearing and the spherical thrust bearing, and a lid member disposed on the shaft and adapted to urge the housing washer against the set of rolling bodies and the rolling bodies against the shaft washer. The axial distance between the spherical roller bearing and the spherical thrust bearing is such that the force lines meet at a point situated on a center axis of the shaft. The spherical rolling bearing has a taper bore and is mounted on a withdrawal sleeve, and the spacing sleeve has internal threads and is screwed onto an external thread on the withdrawal sleeve. A tubular member is arranged about the shaft and is adapted to keep the shaft washer pressed against a rear end of the spacing sleeve facing away from the spherical rolling bearing. The tubular member is secured in position by a locking nut screwed onto threads of the shaft. The dismounting process involves unscrewing the looking nut, axially pulling out the lid member and the housing washer, axially removing the shaft washer and the set of rolling bodies to expose the outwardly facing surface of the spacing sleeve, and thereupon screwing the spacing sleeve in a direction tending to cause the spacing sleeve to move towards the spherical roller bearing so that the thread engagement between the withdrawal sleeve and the spacing sleeve causes the withdrawal sleeve to be pulled axially outwards from its position within an inner race ring of the spherical rolling bearing with the clamping function of the inner race ring on the withdrawal sleeve ceasing, and with the spacing sleeve together with the withdrawal sleeve and the spherical rolling bearing being pulled off the shaft.

BRIEF DESCRIPTION OF THE DRAWING FIGURE

Additional features and characteristics of the present invention will become more apparent from the following detailed description considered with reference to the accompanying drawing FIGURE which is a cross-sectional view of a portion of a thrust bearing assembly according to the present invention.

DETAILED DESCRIPTION OF THE INVENTION

As shown in the drawing FIGURE, the bearing assembly of the present invention is incorporated on a shaft 1 having a cylindrical outer shape and a shoulder 2. A sleeve-shaped housing portion 3 is arranged over the shaft 1. One end of the housing portion 3 possesses an internal diameter less than the inner diameter of the remainder of the housing 3. A double row spherical roller bearing 4 provided with a taper bore and arranged on a withdrawal sleeve 5 is driven up on the shaft 1. The withdrawal sleeve 5 is adapted to be pushed inwards (i.e., to the left with respect to the view shown in the drawing FIGURE) via the intermediary of a tubular tool. On the shaft 1 is further mounted a spherical roller thrust bearing 6. The two bearings 4, 6 are thus positioned within the housing 3 and are adapted to cooperate so that the force lines 4a, 4b from the two rows of rollers in the double row spherical bearing 4 and the force line 6c from the rollers in the spherical roller thrust bearing 6 meet at a point 7 located on the central axis of the shaft 1. The spherical roller thrust bearing 6 includes a shaft washer 6b, a housing washer 6c and a set of rollers located between the two washers 6b, 6c. The shaft washer 6b of the spherical roller thrust bearing 6 is preferably fitted on the shaft 1 with a loose fit. The measures of the different bearings can be gathered from standard bearing catalogues and so it is relatively easy to establish the correct distance between the two bearings when the assembly is mounted in the correct manner.

For obtaining this correct distance, a one-piece integrally formed spacing sleeve 8 of correct axial length is introduced into the housing 3. The spacing sleeve 8 has internal threads and is manually screwed up onto a threaded portion operatively associated with the shaft 1. This threaded portion may be in the form of external threads provided on the withdrawal sleeve 5. The spacing sleeve 8 is manually screwed up onto the threads of the withdrawal sleeve 5 until the front edge of the spacing sleeve 8 abuts against the rear side of the first mounted double-row spherical roller bearing 4. Thereupon, the shaft washer 6b and the set of rollers of the thrust bearing 6 are pushed up on the shaft until the shaft washer 6b abuts against the rear end of the spacing sleeve 8. In this position the shaft washer 6b is in the correct position and a housing washer 6c is fitted in place. A lid member 9 is then placed at the end of the spherical roller thrust bearing 6, thus forming an end closure for the housing 3. The lid member 9 is connected to the housing 3, and this connection can be accomplished in different ways. One way schematically illustrated is through the use of bolts 17.

A mechanism is preferably provided for keeping the housing washer 6c pressed against the set of rollers in the spherical roller thrust bearing 6. This mechanism can preferably be a spring 10 having spring force that can be adjusted via a set screw 11. A tubular member 12 is arranged to keep the shaft washer 6b in position against the spacing sleeve 8. This tubular member 12, and the entire assembly is held together and on the shaft 1 by means of a lock nut 13 screwed onto threads on the shaft 1. The threaded portion of the shaft that is engaged by the lock nut 13 is preferably provided just at the right hand end of the shaft as seen viewing the drawing figure. The threaded portion of the shaft begins generally at the right side end of the tubular member 12 with reference to the illustration in the drawing figure. The lock nut 13 axially pushes the entire assembly towards the shoulder 2 of the shaft 1 so that the end face of the double row spherical roller bearing 4 contacts the shoulder 2.

The bearing assembly is preferably oil-lubricated and, as seen in the drawing figure, is equipped with appropriate seals 14 for this purpose. A sealing member 15 is also arranged between the housing 3 and the lid member 9.

To dismount the bearing assembly, the lock nut 13 is first unscrewed. Thereupon, the set screw 11 is untightened to permit removal of the lid member 9. It is not essential to untighten the set screw 11 to receive the lid member 9, but given that the lid member 9 is under pressure from the compressed spring 10, the lid member 9 can be more easily removed if the spring force is reduced or relieved by unscrewing the set screw 11 before the connection bolts or screws 17 for the lid member 9 are removed. After the lid member 9 is removed, the housing washer 6c of the spherical roller thrust bearing 6 can then be easily removed. At this point, a conventional withdrawal tool (e.g., a withdrawal tool having claws) can be used to reach behind the inner side face of the shaft washer 6b (i.e., the claws of the withdrawal tool can reach behind the inner side face of the shaft washer 6b) and withdraw the shaft washer 6b out from the housing 3, whereupon the outer side face of the spacing sleeve 8 is exposed. This side face of the sleeve 8 has a number of grips 16 in which can be inserted a tool to rotate the spacing sleeve 8 on the withdrawal sleeve 5. The grips 16 are preferably constituted by at least two diametrically spaced apart recesses in the side face of the sleeve 8, and the tool is preferably a tubular member that is adapted to be inserted over the shaft and with projections corresponding to the recesses. The projections on the tool can be correctly and easily inserted into the recesses on the side face of the sleeve as the tubular tool member is centered and guided on the shaft.

With such a tool, the spacing sleeve 8 can be easily screwed inwards, with the inner race ring of the double-row spherical roller bearing 4 preventing such motion by virtue of being clamped between the shoulder 2 and the spacing sleeve 8. The effect of this will be that the withdrawal sleeve 5 is instead pulled out from its position between the cylindrical shaft 1 and the taper bore of the bearing 4, thereby gradually making the grip between the bearing 4 and the shaft 1 cease, whereupon the spacing sleeve 8, the withdrawal sleeve 5 and the double-row spherical roller bearing 4 can be easily picked out from the housing 3.

The principles, preferred embodiments and modes of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A propeller thrust bearing assembly comprising: a housing surrounding a shaft having a center axis, a spherical rolling bearing provided on the shaft and abutting against a shoulder provided on the shaft, a spherical thrust bearing comprised of a shaft washer fitted on the shaft, a housing washer provided in the housing, and a set of rolling bodies provided between the shaft washer and the housing washer, a spacing sleeve provided between the spherical rolling bearing and the spherical thrust bearing, a lid member mounted around the shaft and adapted to urge the housing washer against said set of rolling bodies and via the rolling bodies against the shaft washer, an axial distance between the spherical rolling bearing and the spherical thrust bearing being such that respective force lines meet at a point situated on the center axis of the shaft, the spherical rolling bearing having a taper bore and being mounted on a withdrawal sleeve that is positioned on the shaft, the spacing sleeve having internal threads and being screwed onto an external thread on the withdrawal sleeve, and including a tubular member arranged about the shaft to keep the shaft washer pressed against an end of the spacing sleeve facing away from the spherical rolling bearing, said tubular member being secured in position by a locking nut screwed onto threads of the shaft.

2. The propeller thrust bearing as claimed in claim 1, wherein the spacing sleeve has a rearmost end surface provided with recesses adapted to receive a gripping tool to rotate the spacing sleeve and axially move the spacing sleeve in either direction along the threads of the withdrawal sleeve.

3. The propeller thrust bearing as claimed in claim 1, wherein the shaft washer of the spherical thrust bearing is arranged on the shaft with a loose fit.

4. The propeller thrust bearing as claimed in claim 1, wherein the shaft is completely smooth between the shoulder and shaft threads present on the shaft.

5. A propeller thrust bearing assembly comprising:
- a spherical rolling bearing mounted on a shaft and abutting against a stop provided on the shaft;
- a spherical thrust bearing comprised of a shaft washer fitted on the shaft, a housing washer, and a set of rolling bodies located between the shaft washer and the housing washer;
- a spacing sleeve between the spherical rolling bearing and the spherical thrust bearing to space the spherical rolling bearing from the spherical thrust bearing, the spacing sleeve including an internal thread engaging a threaded portion on the shaft; and
- a lid member adapted to axially urge the housing washer towards the set of rolling bodies.

6. The propeller thrust bearing as claimed in claim 5, including a locking nut mounted on the shaft to maintain the spherical rolling bearing and the spherical thrust bearing in position on the shaft.

7. The propeller thrust bearing as claimed in claim 5, wherein said threaded portion is formed on a withdrawal sleeve that is mounted on the shaft.

8. The propeller thrust bearing as claimed in claim 7, wherein the spherical rolling bearing possesses a taper bore and is mounted on the withdrawal sleeve.

9. The propeller thrust bearing as claimed in claim 5, wherein the spherical rolling bearing possesses a taper bore and is mounted on a withdrawal sleeve that is positioned on the shaft.

10. The propeller thrust bearing as claimed in claim 5, including a tubular member arranged about the shaft to keep the shaft washer pressed against an end of the spacing sleeve facing away from the spherical rolling bearing, said tubular member being secured in position by a locking nut mounted on the shaft.

11. The propeller thrust bearing as claimed in claim 10, wherein the locking nut threadably engages the shaft.

12. The propeller thrust bearing as claimed in claim 5, wherein the spacing sleeve has a rearmost end surface provided with recesses adapted to receive a gripping tool to rotate the spacing sleeve and axially move the spacing sleeve in either direction along the threaded portion.

13. The propeller thrust bearing as claimed in claim 5, including a housing surrounding the shaft, the spherical rolling bearing and the spherical thrust bearing being positioned within said housing.

14. The propeller thrust bearing as claimed in claim 13, wherein the lid member is connected to the housing by connection means.

15. The propeller thrust bearing as claimed in claim 5, wherein the spherical rolling bearing and the spherical thrust bearing are spaced apart by an axial distance such that respective force lines meet at a point situated on a center axis of the shaft.

* * * * *